United States Patent
Sathe et al.

(10) Patent No.: US 11,593,716 B2
(45) Date of Patent: Feb. 28, 2023

(54) ENHANCED ENSEMBLE MODEL DIVERSITY AND LEARNING

(71) Applicant: INTERNATIONAL BUSINESS MACHINES CORPORATION, Armonk, NY (US)

(72) Inventors: Saket Sathe, Mohegan Lake, NY (US); Deepak Turaga, Elmsford, NY (US); Charu Aggarwal, Yorktown Heights, NY (US); Raju Pavuluri, Yorktown Heights, NY (US); Yuan-Chi Chang, Armonk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 993 days.

(21) Appl. No.: 16/381,979

(22) Filed: Apr. 11, 2019

(65) Prior Publication Data
US 2020/0327456 A1    Oct. 15, 2020

(51) Int. Cl.
*G06K 9/00* (2022.01)
*G06N 20/20* (2019.01)
*G06K 9/62* (2022.01)

(52) U.S. Cl.
CPC ........... *G06N 20/20* (2019.01); *G06K 9/6223* (2013.01); *G06K 9/6267* (2013.01)

(58) Field of Classification Search
CPC ...... G06F 16/285; G06F 17/18; G06F 40/279; G06F 40/295; G06F 40/30; G06F 16/2471; G06F 7/24; G06N 20/00; G06N 20/10; G06N 5/022; G06N 5/04; G06N 7/005
See application file for complete search history.

(56) References Cited

U.S. PATENT DOCUMENTS

| | | | | |
|---|---|---|---|---|
| 2005/0147292 | A1* | 7/2005 | Huang | G06V 40/172 382/218 |
| 2009/0097741 | A1* | 4/2009 | Xu | G06K 9/6252 382/159 |
| 2013/0097103 | A1 | 4/2013 | Chari et al. | |
| 2018/0082419 | A1 | 3/2018 | Fetzer | |

(Continued)

FOREIGN PATENT DOCUMENTS

| | | |
|---|---|---|
| CN | 201710605177 A | 7/2017 |
| CN | 109032829 A | 12/2018 |

OTHER PUBLICATIONS

Nnamoko, Nonso Alexanda, "Ensemble-based Supervised Learning for Predicting Diabetes Onset", PhD Thesis, Liverpool John Moores University, Jul. 2017, http://researchonline.ljmu.ac.Uk/id/eprint/8337/1/201 7NnamokoPhD.pdf (129 pages).

(Continued)

*Primary Examiner* — Alex Kok S Liew
(74) *Attorney, Agent, or Firm* — Griffiths & Seaton PLLC

(57) ABSTRACT

Embodiments for implementing enhanced ensemble model diversity and learning by a processor. One or more data sets may be created by combining one or more clusters of data points of a minority class with selected data points of a majority class. One or more ensemble models may be created from the one or more data sets using a supervised machine learning operation. An occurrence of an event may be predicted using the one or more ensemble models.

20 Claims, 8 Drawing Sheets

(56) References Cited

U.S. PATENT DOCUMENTS

2018/0150757 A1    5/2018  Aggarwal et al.
2020/0177633 A1*   6/2020  Shivamoggi .......... G06F 16/285

OTHER PUBLICATIONS

Yen et al., "Cluster-based Under-sampling Approaches for Imbalanced Data Distributions", Expert Systems with Applications: An International Journal, vol. 36, Issue 3, Apr. 2009 pp. 5718-5727, https://doi.org/10.1016/j.eswa.2008.06.108 (10 pages).
Ksieniewicz, Pawel, "Undersampled Majority Class Ensemble for Highly Imbalanced Binary Classification", Proceedings of Machine Learning Research 94: 82-94, 2018, (13 pages).
Stahl et al., "Ensemble Glucose Prediction in Insulin-Dependent Diabetes", In book: Data-Driven Modeling for Diabetes pp. 37-71, DOI: 10.1007/978-3-642-54464-4_2, 2014, (36 pages).
Jung et al., "Prediction of Daytime Hypoglycemic Events Using Continuous Glucose Monitoring Data and Classification Technique", arXiv: Machine Learning arXiv:1704.08769, 2017, (16 pages).
Martinsson et al., "Automatic Blood Glucose Prediction with Confidence Using Recurrent Neural Networks", Proceedings of the 3rd International Workshop on Knowledge Discovery in Healthcare Data, 2018, (5 pages).
H. Xiao, "Learning Temporal State of Diabetes Patients via Combining Behavioral and Demographic Data." 2017 Applied Data Science Paper KDD'17, Aug. 13-17, 2017, Halifax, NS, Canada, pp. 2081-2089.
S. Rayana, "Ensemble and Multimodal Learning for Anomaly Mining: Algorithms and Applications," Ph.D. Dissertation, Computer Science, Stony Brook University, Aug. 2017. (160 Pages).
T. Liu, 2011. "A learning strategy for highly imbalanced classification." In Proceedings of the Third International Conference on Internet Multimedia Computing and Service (ICIMCS '11). ACM, New York, NY, USA, 116-119.
N. Chawla, 2003, "SMOTEBoost: Improving Prediction of the Minority Class in Boosting." In: Lavrač N., Gamberger D., Todorovski L., Blockeel H. (eds) Knowledge Discovery in Databases: PKDD 2003. PKDD 2003. Lecture Notes in Computer Science, vol. 2838. Springer, Berlin, Heidelberg.
M. Buda, "A systematic study of the class imbalance problem in convolutional neural networks." (Submitted on Oct. 15, 2017) https://arxiv.org/abs/1710.05381 (23 Pages).
S. Barua, "MWMOTE—Majority Weighted Minority Oversampling Technique for Imbalanced Data Set Learning," in IEEE Transactions on Knowledge and Data Engineering, vol. 26, No. 2, pp. 405-425, Feb. 2014. (21 Pages).

* cited by examiner

ENHANCED ENSEMBLE MODEL DIVERSITY AND LEARNING

BACKGROUND OF THE INVENTION

Field of the Invention

The present invention relates in general to computing systems, and more particularly to, various embodiments for enhancing supervised ensemble models using unsupervised machine learning by a processor.

Description of the Related Art

In today's society, various medical advances, coupled with advances in technology have made possible a wide variety of attendant benefits, such as the computerized monitoring of a patient, or the storing or organization of data representative of a patient's health records. As computers, processors, storage devices and mobile computing platforms proliferate throughout aspects of society, additional opportunities continue to present themselves for leveraging technology in health care for the benefit of patients, health professionals, and others.

SUMMARY OF THE INVENTION

Various embodiments for implementing enhanced ensemble model diversity and learning by a processor, are provided. In one embodiment, by way of example only, a method for implementing enhanced ensemble model diversity and learning by a processor is provided. One or more data sets may be created by combining one or more clusters of data points of a minority class with selected data points of a majority class. One or more ensemble models may be created from the one or more data sets using a supervised machine learning operation. An occurrence of an event may be predicted using the one or more ensemble models.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
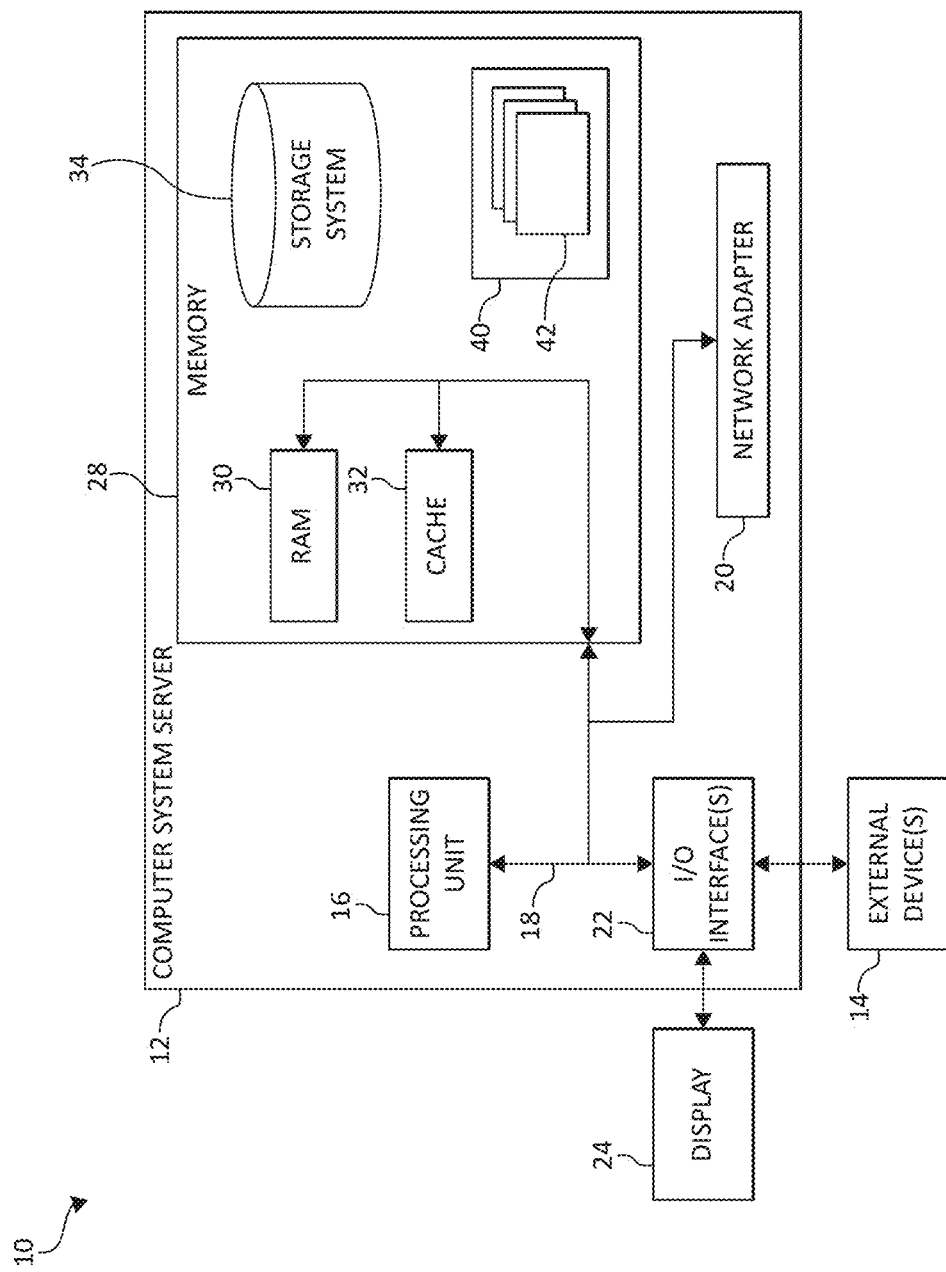
FIG. 1 is a block diagram depicting an exemplary computing node according to an embodiment of the present invention.

Many patients suffer from various diseases, such as diabetes mellitus ("diabetes") that require consistent management and attention. Diabetes is due to either the pancreas not producing enough insulin or the cells of the body not responding properly to the insulin produced. Management of diabetes concentrates on keeping blood sugar levels as close to normal, without causing low blood glucose/sugar ("Hypoglycemia"). Frequently, in order to avoid hypoglycemia, diabetics maintain abnormally high blood glucose levels to provide a "buffer" against low blood glucose levels. This constant high blood glucose level is the root cause of most long-term complications of diabetes, namely, retinopathy, neuropathy, nephropathy, and cardiovascular disease. For example, blood sugar monitoring devices are presently available to provide real-time continuous blood sugar monitoring that alarms the patient upon detection of a hypoglycemia condition. However, there is a need for a computing system to accurately predict a hypoglycemia condition prior to the detection of a hypoglycemia condition in a patient.

In one aspect, the mechanisms of the illustrated embodiments employ artificial intelligence, such as machine learning, to allow computers to simulate human intelligence and choices based on significant amounts of empirical data. Machine learning may capture characteristics of interest, such as the diabetes, and their underlying probability distribution, and a training data set may be used to train a machine learning model. A model or rule set may be built and used to predict a result based on the values of a number of features. The machine learning may use a data set that typically includes, for each record, a value for each of a set of features, and a result. From this data set, a model or rule set for predicting the result is developed.

In one aspect, machine learning may be employed for hypoglycemia predictions (e.g., predicting hypoglycemic events in Type 1 and Type II Diabetes Patients). For example, patients who need insulin often carry insulin pumps that can deliver insulin boluses either in a pre-programmed manner or on need basis. Each bolus event has a set of features associated with the event. The bolus event may also have a label indicating whether that event lead to hypoglycemia ("HYPO") or non hypoglycemia ("NON-HYPO"). That is, a bolus event may have two labels: hypoglycemic (e.g., "HYPO") or non-hypoglycemic (e.g., "NON-HYPO"), depending on whether a hypoglycemic event has occurred or not in the 2-4 hour window that may be defined as a fixed time period of a window that may include one or more HYPO or NON-HYPO events. The prediction of a hypoglycemic event can be in the form of probability distribution over the set of labels such as, for example, the prediction for a test point may be 0.7 for the HYPO event or 0.3 for a NON-HYPO event.

A classification of data points relating to both HYPO and NON-HYPO classes may be severely imbalanced such as, for example, HYPO labels may never exceed more than 10% of the data. Even with an imbalance of classes, machine learning may be used for predicting whether a low blood glucose event can occur after a bolus is injected by the patient and notifying the patients up to a defined time period (e.g., 2-3 hours in advance) so that the patient may have sufficient time for corrective action. A hypoglycemia event may be defined as a blood glucose level dropping below a threshold in a 2-4 hour window after a bolus is administered by the patient. A reverse hypo delay ("RHD" which may be equivalent to a average reverse event delay) may be computed using the 2-4 window and a plurality of features are derived in a time window prior to the bolus event. Each of the features (including the RHD) may be derived in windows ranging from a few minutes to a few months.

However, current machine learning operations experience several challenges such as, for example, where unsupervised machine learning operations are needed for improving the quality of supervised ensemble models. Moreover, ensemble models require diversity of the models in each of its weak learners to obtain the best variance reduction after combining the models. If the data classes are heavily unbalanced, with a rare class (e.g., a minor class) being the most important one, it is hard to create machine learning models which learn different modes/characteristics of the important rare class. That is, machine learning prediction becomes less efficient in situations where classes or features are heavily unbalanced, with a rare class or feature being identified as the most important class or feature that may be referred to as a "minority class" (or a highest ranked class or feature that is also the most rare), and it is extremely difficult to create predictive models which learn different modes/characteristics of the important rare class (e.g., minority class).

Thus, in one aspect, the present invention provides for implementing enhanced ensemble model diversity and learning by a processor, are provided. In one embodiment, by way of example only, a method for implementing enhanced ensemble model diversity and learning by a processor is provided. One or more data sets may be created by combining one or more clusters of data points of a minority class with selected data points of a majority class. One or more ensemble models may be created from the one or more data sets using a supervised machine learning operation. An occurrence of an event may be predicted using the one or more ensemble models.

In an additional aspect, the present invention provides for a reliable and accurate model for hypoglycemia prediction for diabetes patients by constructing diverse ensemble learning over highly unbalanced data sets such as, for example, in hypoglycemia events in Type I and Type II diabetes patients.

In an additional aspect, unsupervised machine learning operations may be learned, generate, and/or built for ensuring model diversity in the ensemble models even when an original data set is highly unbalanced (e.g., unbalanced data points that may represent a minority class of events or a majority class of events). One or more reliable and accurate model may be created/built for predicting an event (e.g., hypoglycemia event prediction for diabetes patients) for a selected group/user according to data (e.g., insulin pump data), user (e.g., patient) demographic data, and/or user behavioral data, which may have characteristics of event classification imbalance in the collected data set.

Additionally, in association with the machine learning, user (e.g., patient) behavior may be modified using notifications. For example, patients may be provided notifications that a hypoglycemia event is probable so that the patients take action and hypoglycemia does not occur. A user may provide feedback indicating a degree of efficiency and usefulness of the notification. The present invention may continuously learn from the data and continuously improve machine learning models. One or more patterns and trends may be learned and analyzed over a defined time period. All user information, actions performed by the user, and notifications may be stored in repository. The stored data may be used for long-term analysis of pattern and trend change-detection. In addition, a user may visualize all the stored information, including hypoglycemia predictions and the data/features used for computing the prediction. This data may be provided to one or more users via an interactive dashboard (e.g., via graphical user interface "GUI") for understanding activities and events of the user and provide insights on and what activities leads to a defined event (e.g., hypoglycemia) actions that should and/or should not be performed relating to the event.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
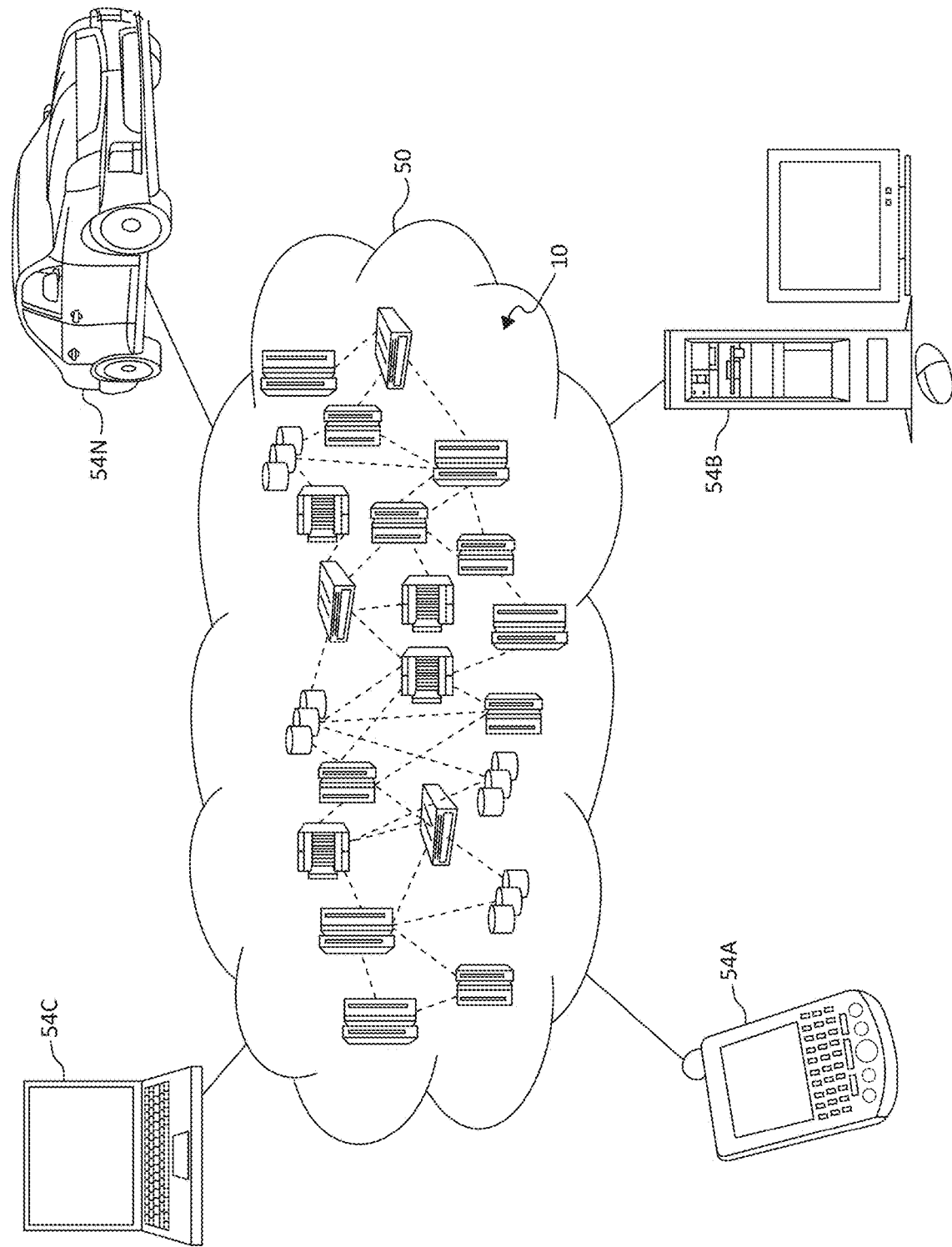
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
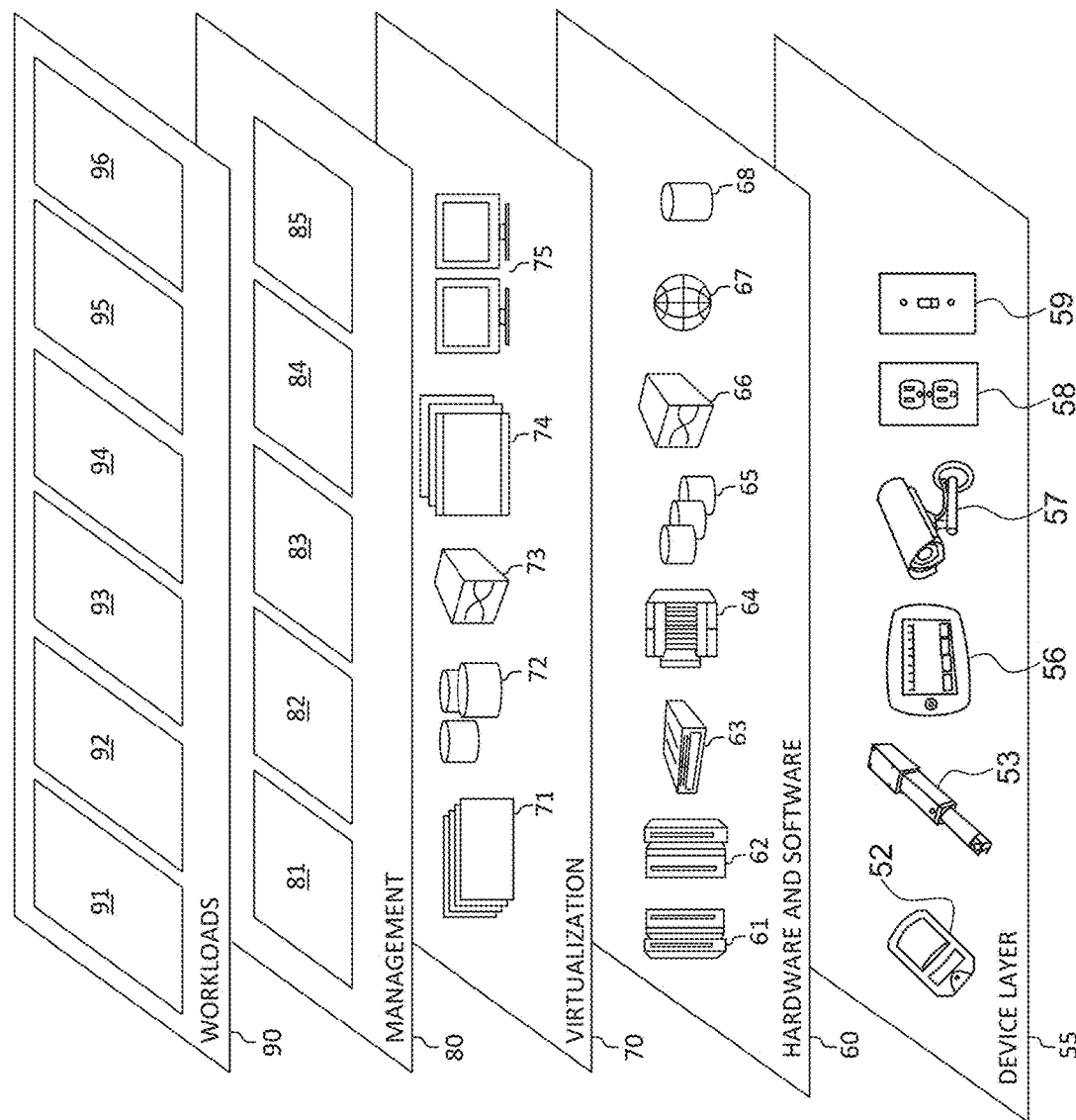
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing enhanced ensemble model diversity and learning. In addition, workloads and functions 96 for implementing enhanced ensemble model diversity and learning may include such operations as data analysis (including data collection and processing from various environmental sensors), and predictive data analytics functions. One of ordinary skill in the art will appreciate that the workloads and functions 96 for implementing enhanced ensemble model diversity and learning may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides for enhanced ensemble model diversity and learning. One or more unsupervised machine learning operations may be used for creating data sets for weak learners (e.g., base ensemble component models) in an ensemble model. A class imbalance may be balanced by clustering a minority class and then creating data sets for weak learning by combining each of these minority clusters with random samples from a majority class. One or more ensemble models may be created/learned for each data set using supervised machine learning approaches. A score for a test data point may determined by combining the predictions from the base ensemble component models that were created from the data sets.

In one aspect, the weak learners may be learned or trained to detect the various sub-types of one or more minority classes, where such sub-types may be obtained by a clustering process. In one aspect, the sub-types may be detected by clustering various features. The sub-types are learned from the data using unsupervised machine learning operations. A minority class (e.g., a class of minor features or particular data points) may be partitioned into groups/clusters using an average reverse event delay. That is, the data sets may be created such that the weak learners are learned to detect the various sub-types of the minority class, where such sub-types are obtained by a clustering process. The minority class may be partitioned into groups/clusters using a supervised machine learning operation instead of an unsupervised machine learning operation.

A prediction for a test point may be obtained by combining the predictions from the K classifiers in the ensemble point. A feature vector may be computed in a time window around and/or prior to a bolus event that can be computed based on different data sources and labeled as being "HYPO" or non-"NON-HYPO" using pre-established criteria. For example, the pre-established criteria may be data related to an event such as, for example hypoglycemia defined as the blood glucose dropping below 70 mg/dl for about 10 minutes within a time window (e.g., 4 hr, 3 hr, or 2 hr) after a patient injects himself/herself with a bolus. Therefore, if the blood glucose level drops below 70 mg/dl during the time window after the bolus, the event may be "marked" (e.g., an indication) that bolus as HYPO, otherwise it may be marked as NON-HYPO. That is, past data may be used to find out which boluses are HYPO or NON-HYPO and then one or more features may be extracted from the data and a machine learning algorithm may be trained to predict whether a bolus will be HYPO or NON-HYPO.

Demographic information of the patients and the bolus event features may also be combined to form bolus features (e.g., features of a set of original data points prior to being clustered into the minority class). The features may be grouped into the minority class (e.g., HYPO features) and a majority class (e.g., NON-HYPO features). The minority class (e.g., HYPO features) may be clustered into K clusters of a minority class. An ensemble model may be created by learning at least K classifiers for each of the K clusters of a minority class as compared to the majority cluster. A prediction for a test point may be obtained by combining the predictions from the K classifiers of the minority class in the ensemble point. The prediction may be a score of the bolus event leading to an event of the minority class (e.g., HYPO event) or a majority class (e.g., a NON-HYPO event).

In one aspect, a misclassification may occur if a model misclassifies a label of known entities. The machine learning model may be built using either a cost minimization technique such as, for example, a gradient descent or other techniques using a Gini index. One or more individual models in the ensemble method can be learned using a variety of classification algorithms like decision forests, support vector machine (SVM), logistic regression, etc. The misclassification cost may be measured using the area-under-curve ("AOC") of a receiver operating characteristic (ROC) where the HYPO is class and is treated as positive. Other measures such as positive predictive values (PPV) may also be used to measure performance.

Figure 4:
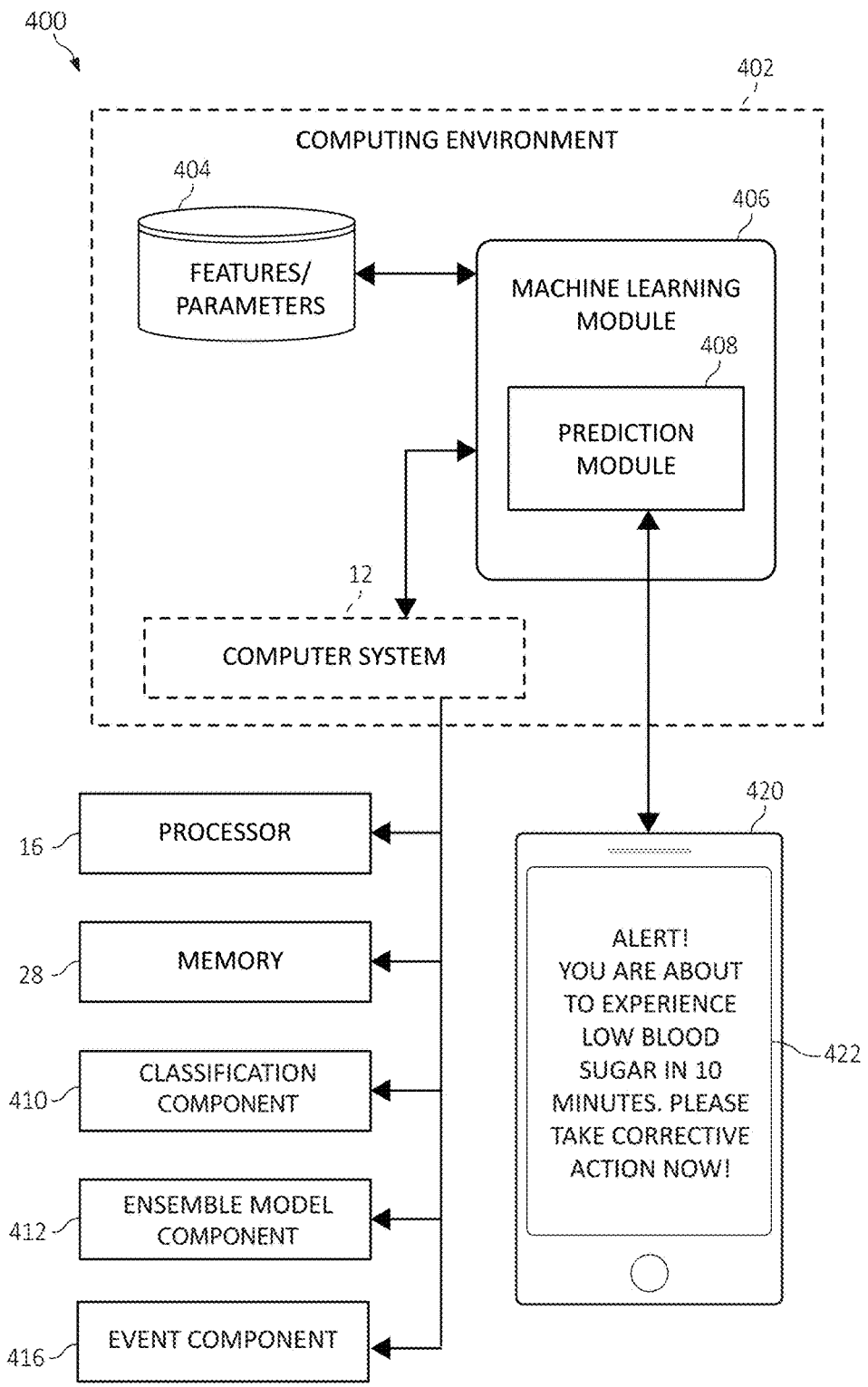
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments, is shown. FIG. 4 illustrates for implementing enhanced ensemble model diversity and learning in a computing environment, such as a computing environment 402, according to an example of the present technology. With the foregoing in mind, the module blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere.

As will be seen, many of the functional blocks may also be considered "modules" of functionality, in the same descriptive sense as has been previously described in FIGS. 1-3. For example, computer system/server 12 of FIG. 1 is again shown, which may also processing unit 16 and memory 28 of FIG. 1 to perform various computational, data processing and other functionality in accordance with various aspects of the present invention.

The system 400 may include the computing environment 402 and a device 420, such as a desktop computer, laptop computer, tablet, internet of things ("IoT") device (e.g., smart phone or wearable devices/sensors), and/or another electronic device that may have one or more processors and memory. The device 420 and the computing environment 402 may each be associated with and/or in communication with each other, by one or more communication methods, such as a computing network. In one example, the device 420 may be controlled by a user (e.g., an owner, administrator, customer, domain expert, or patient) associated with the computing environment 402. In another example, the device 420 may be completely independent from the user (e.g., an owner, administrator, customer, domain expert, or patient) of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters database 404 that is associated with a machine learning module 406. The computing environment 402 may also include a computer system 12, as depicted in FIG. 1. The computer system 12 may also include a classification component 410, an ensemble model component 412, and an event component 416 each associated with the machine learning module for training and learning one or more machine learning models and also for applying multiple combinations of features and/or parameters to the machine learning model that is being tested.

In one aspect, the machine learning module 406 may include a prediction module 408 for predicting an event. For example, the computer system 12, using the ensemble model component 412 and the event component 416, may define an event such as, for example, a hypoglycemic event where the blood glucose level drops below a threshold in a time-series window after a bolus is administered by the patient.

The classification component 410 may create one or more data sets by combining one or more clusters of data points of a minority class (e.g., minor features) with selected data points of a majority class (e.g., majority of features). The classification component 410 may extract one or more features from a plurality of data points and classify those of the plurality of data points into a majority class or a minority class according to the one or more features. The classification component 410 may determine a score for a test data point by combining one or more predictions from the one or more ensemble models.

In an additional aspect, the classification component 410 may cluster a plurality of minority class data points into a K number of clusters, wherein the K number of clusters form the minority class and augment each of the K number of clusters the minority class with a random number of the selected data points of the majority class. The classification component 410 may even detect one or more sub-classes of the minority class. The classification component 410 may partition the minority class into the one or more clusters of data points using a supervised machine learning operation. The classification component 410 may label the one or more clusters of data points of the minority class according to predefined criteria.

The ensemble model component 412 may create one or more ensemble models from the one or more data sets using a supervised machine learning operation.

The prediction module 408 may predict an occurrence of an event using the one or more ensemble models. One or more machine learning models or "classifiers" may be learned or trained by the machine learning module 406 using the average event delay and/or the prediction module 408 in addition to other features and/or parameters. The prediction module 408 may predict the hypoglycemic event in diabetic patients based on learned or trained classifiers.

The device 420 may include a graphical user interface (GUI) 422 enabled to display on the device 420 one or more user interface controls for a user to interact with the GUI 422. For example, the GUI 422 may display the predicted hypoglycemic event via an alert. For example, the predicted hypoglycemic event may be an alert that indicates or displays audibly and/or visually on the GUI 422 "ALERT! You are about to experience low blood sugar in 10 minutes. Please take corrective action now!"

The features/parameters 404 may be a combination of features/parameters and a recipe for processing features/ parameters that may be applied to the same input data relating to testing, monitoring, and/or calculating various conditions or diagnostics of a condition of a patient. That is, different combinations of parameters may be selected and applied to the same input data for learning or training one or more machine learning models.

In one aspect, the predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naïve bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
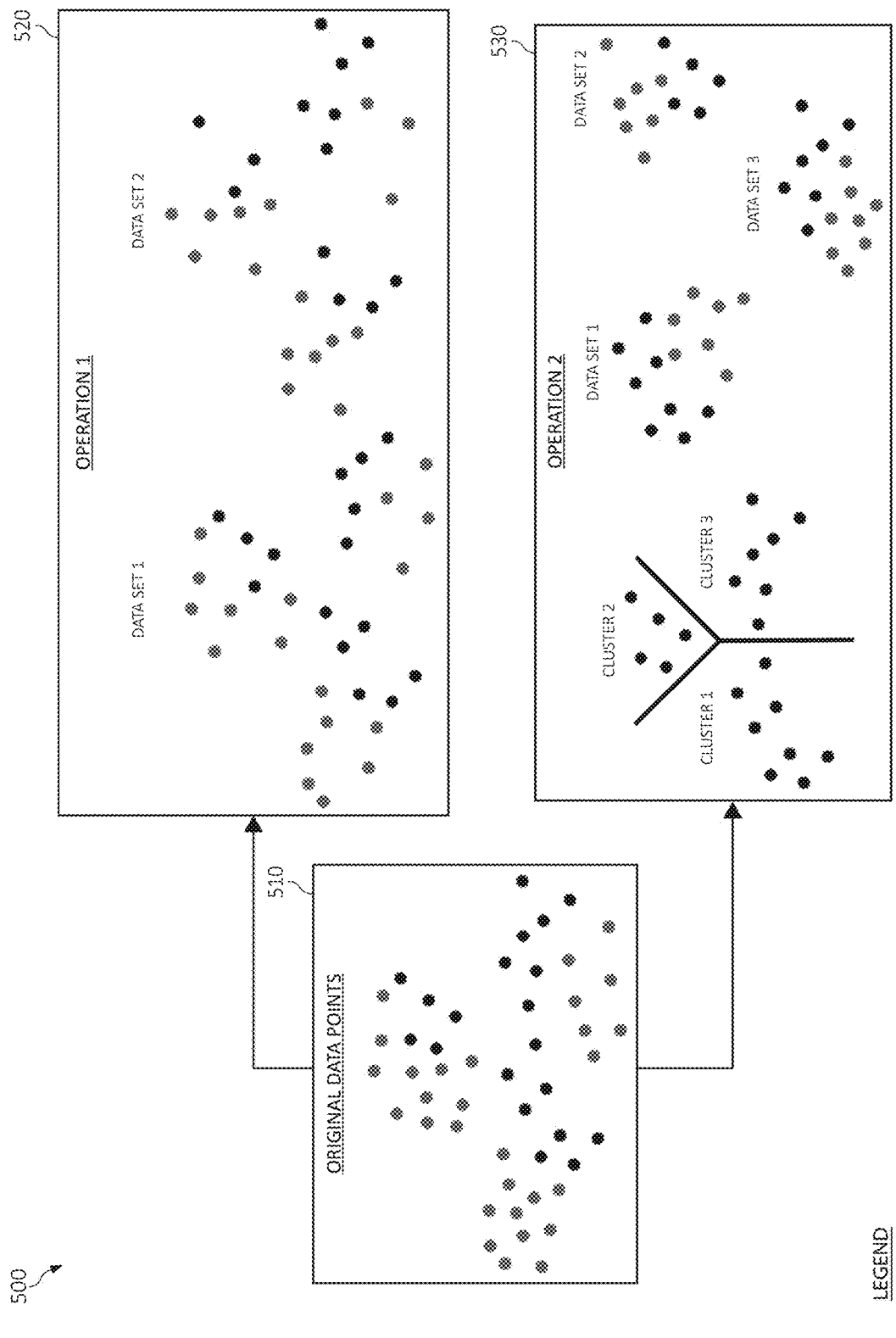
FIG. 5 is a diagram depicting operations for ensemble learning and diversity in accordance with aspects of the present invention.

Turning now to FIG. 5, a system 500 is illustrated showing operations for ensemble learning and diversity. In one aspect, one or more of the components, modules, services, applications, and/or functions described in FIGS. 1-4 may be used in FIG. 5. Repetitive description of like elements, components, modules, services, applications, and/ or functions employed in other embodiments described herein is omitted for sake of brevity. As shown, the various blocks of functionality are depicted with arrows designating the blocks' 500 relationships with each other and to show process flow. Additionally, descriptive information is also seen relating each of the functional blocks 500.

In one aspect, the illustrative embodiments depict the need for diversity in ensemble learning. For example, one classification problem of predicting events is where classification creates an imbalance of classes where a minority class is designed as important or high priority but unable to be classified as such. A classifier ("prediction model") may be trained or learned using in addition to other features, but it is critical that each model specializes on a subset of data from original data points. As depicted in the original data points 510, a class imbalance is illustrated showing more data points for a majority class and less data points for a minority class.

For example, in operation 520 (e.g., operation 1) data set 1 and data set 2 are classified from the original data points 510. That is, partitions of the original data points 510 are created by drawing random subsamples to create training data sets for individual models in the ensemble. However, operation 520 (e.g., operation 1) fails to yield an optimal and diverse training data sets for generating accurate ensemble learning models.

In contrast, operation 530 (e.g., operation 2) first clusters the minority class (e.g., darker shaded dots) into clusters 1, 2, and 3 from the original data points 510. At this point, after clustering the data points into a minority class (e.g., clusters 1, 2, and 3), each group in the minority class may contain similar types of events (e.g., similar type of events forming the minority class).

Training data sets (e.g., data set 1, data set 2, and data set 3) are then created for weak learning by combining each of the clusters (e.g., clusters 1, 2, and 3) with random samples from the majority class (e.g., the lighter shaded dots). The training data sets (e.g., data set 1, data set 2, and data set 3) may be optimally diversified and may be used to create one or more ensemble models using supervised machine learning operations, as illustrated in FIG. 6.

Now for each group or clusters (e.g., clusters 1, 2, and 3), a machine learning model may be learned or trained to predict an event such as, for example, hypoglycemia. This improves prediction accuracy using diverse ensemble models based on clustering the features, localized groups of data points according into the minority class first and then adding random samples from the majority class to each minority class cluster may be. The machine learning model may be trained per-cluster (or per group such as majority class or minority class), rather than just training one machine learning model for all data to enable increased prediction accuracy.

Figure 6:
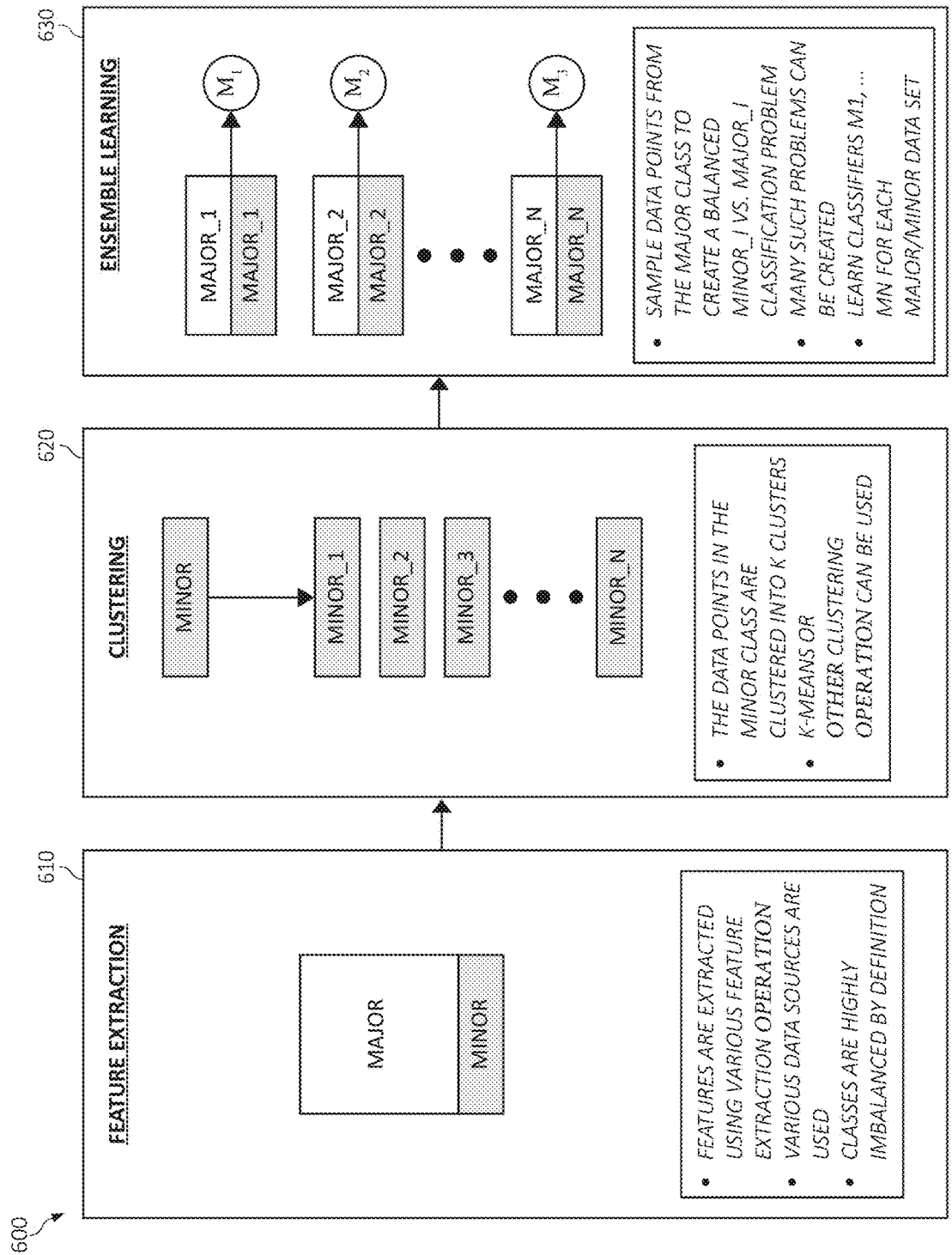
FIG. 6 is a diagram depicting operations for diversity enhancing ensemble model learning in accordance with aspects of the present invention.

FIG. 6 is a diagram depicting operations for diversity enhancing ensemble model learning. In one aspect, one or more of the components, modules, services, applications, and/or functions described in FIGS. 1-5 may be used in FIG. 6. Repetitive description of like elements, components, modules, services, applications, and/or functions employed in other embodiments described herein is omitted for sake of brevity. As shown, the various blocks of functionality are depicted with arrows designating the blocks' 600 relationships with each other and to show process flow. Additionally, descriptive information is also seen relating each of the functional blocks 600.

Starting in block 610, one or more features may be extracted using various feature extraction operations, where the features may be extracted from various data sources. In block 620, once the features are computed, the features may be grouped together using an unsupervised operation such as, for example, data clustering. In one aspect, the features are clustered using an unsupervised machine learning operation and one or more machine learning models may be learned using a supervised machine learning operation. Cluster analysis or clustering may be the task of grouping a set of objects in such a way that objects in the same group (called a cluster) are more similar (in some sense or another) to each other than to those in other groups (clusters). That is, data points may be clustering first into a minor class with the minor class being clustered into K clusters (e.g., using K-means or other clustering operation), where "K" is a positive integer).

In block 630, random data points may be selected and added to each of the K clusters of the minority class to create a balanced ensemble model of minority and majority class (e.g., $minor_i$ compared to $major_j$, which refers to a classification problem of distinguishing between the $minor_i$ class compared to $major_j$ class) such that a plurality of diversified ensemble models (e.g., $M_1$, $M_2$, and $M_n$) may be created for each major/minor data set. That is, as illustrated in block 630, 1) sample data points from a major class to create a balanced $minor_i$ compared to $major_j$ classification problem, 2) create one or more promany such problems can be created, and 3) learn classifiers $M_1$, . . . $M_n$ for each major/minor data set. To illustrate, consider the following example. Assume you have a data set having 20 data points (e.g., red data points for illustration purposes) and 100 data points (e.g., blue data points for illustration purposes and where red and blue may represent two different classes such as, for example, a minority class and a majority class). As such, the data set is not balanced. The red points may represent the minority class and blue points may represent the majority class. The steps followed are as follows. In step 1, the points from the red (minority) class may be clustered into a selected number of clusters (e.g., 5 clusters). In step 2, for each of the red cluster (from step 1), the same number of points may be clustered from the blue (majority) class. Combine these red and blue points and form a "balanced" data set (e.g., the balanced data set now has equal number of points from each class). In step 3, a classifier may be trained on the balanced data set from step 2. In step 4, steps 2 and 3 may be performed for each cluster, resulting in 5 classifiers. In step 5, during a prediction operation, one or more predictions (e.g., either for red or blue) may be generated from all 5 classifier and return a majority vote as a final prediction.

Thus, the diversity enhanced ensemble model learning includes using a combination of unsupervised operations for learning enhancing ensemble models by ensuring that diversity of the weak learners that form the ensemble model. By first clustering the minority class, several sub-types of the minority class may be discovered and may be used for forming the diversified ensemble models (e.g., $M_1$, $M_2$, and $M_n$). The minority class may be augmented with the random subsamples of the majority class solves the problem of unbalanced classes.

Figure 7:
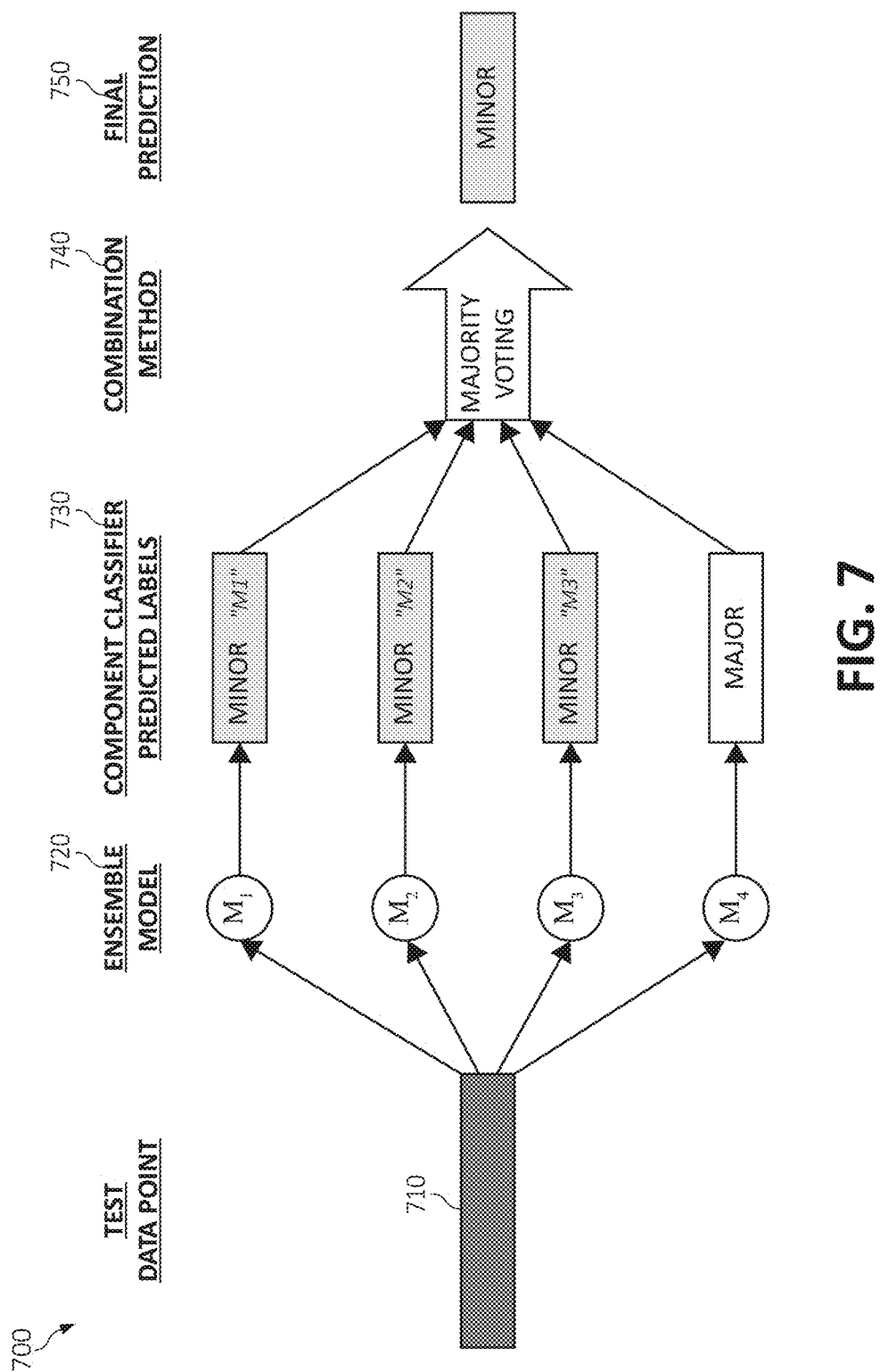
FIG. 7 is a diagram depicting operations for label prediction using ensemble models in accordance with aspects of the present invention.

FIG. 7 is a diagram depicting operations for label prediction using ensemble models. In one aspect, one or more of the components, modules, services, applications, and/or functions described in FIGS. 1-6 may be used in FIG. 7. Repetitive description of like elements, components, modules, services, applications, and/or functions employed in other embodiments described herein is omitted for sake of brevity. As shown, the various blocks of functionality are depicted with arrows designating the blocks' 700 relationships with each other and to show process flow. Additionally, descriptive information is also seen relating each of the functional blocks 700.

In block 720, test data points 710 may be gathered, collected, and/or received and provided to the diversified ensemble models (e.g., $M_1$, $M_2$, and $M_n$, created from FIGS. 5 and 6) to be tested by each of the ensemble models.

In block 730, each of the diversified ensemble models (e.g., $M_1$, $M_2$, and $M_n$) may use the test data point 710 and the test data point may be scored by combining one or more predictions from the one or more ensemble models (e.g., $M_1$, $M_2$, and $M_n$). That is, diversified ensemble models (e.g., $M_1$, $M_2$, and $M_n$) may predict whether the test data point 710 is either from the majority class and/or from the minority class. A combination operation may be performed by majority voting, as in block 740. A final prediction (e.g., whether the test data point 710 is either from the majority class and/or from the minority class) may be performed, as in block 750. It should be noted that the final voting operation generates a prediction which is more accurate than each of the ensemble models prediction and may be referred to as the "variance reduction effect of ensemble models."

Figure 8:
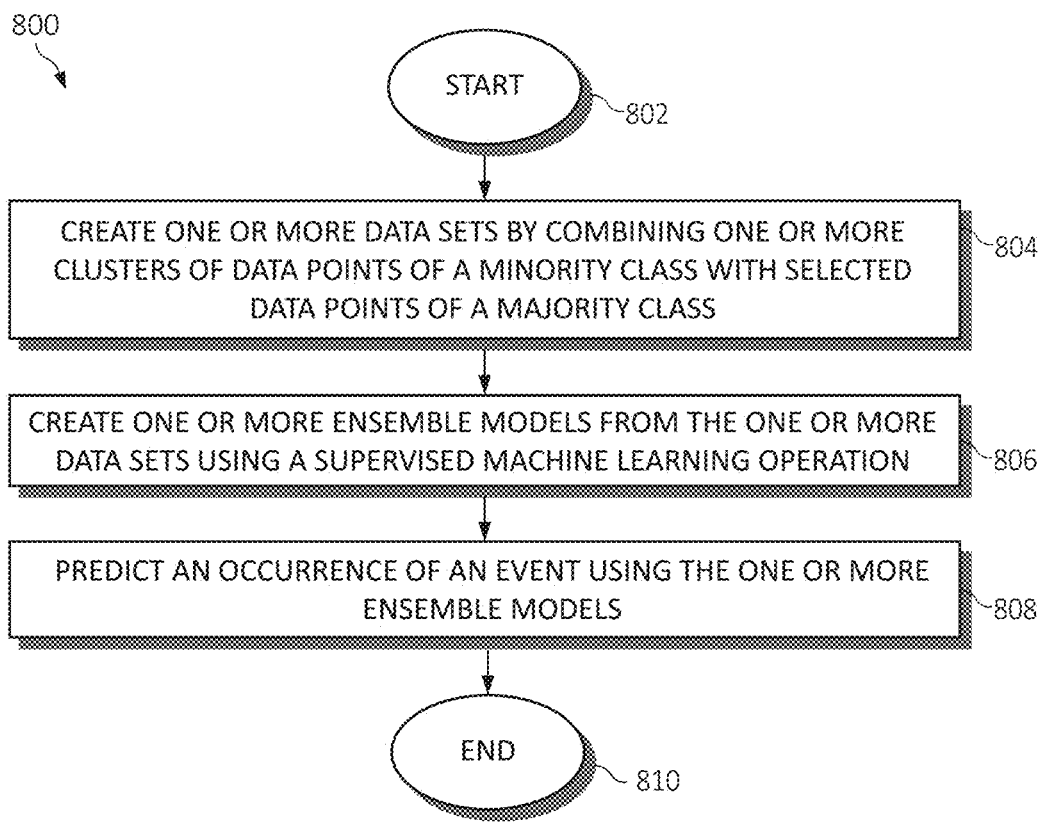
FIG. 8 is a flowchart diagram of an exemplary method for implementing enhanced ensemble model diversity and learning by a processor, in which various aspects of the present invention may be realized.

FIG. 8 is a method 800 for implementing enhanced ensemble model diversity and learning by a processor, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more data sets may be created by combining one or more clusters of data points of a minority class with selected data points of a majority class, as in block 804. One or more ensemble models may be created from the one or more data sets using a supervised machine learning operation, as in block 806. An occurrence of an event may be predicted using the one or more ensemble models, as in block 808. The functionality 800 may end in block 810.

In one aspect, in conjunction with and/or as part of at least one block of FIG. 8 the operations of method 800 may include each of the following. The operations of method 800 may determine a score for a test data point by combining one or more predictions from the one or more ensemble models.

The operations of method 800 may extract one or more features from a plurality of data points, classify those of the plurality of data points into a majority class or a minority class according to the one or more features, cluster a plurality of minority class data points into a K number of clusters, wherein the K number of clusters form the minority class, and/or augment each of the K number of clusters the minority class with a random number of the selected data points of the majority class. The operations of method 800 may also detect one or more sub-classes of the minority class. The operations of method 800 may partition the minority class into the one or more clusters of data points using a supervised machine learning operation, and/or label the one or more clusters of data points of the minority class according to predefined criteria.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing enhanced ensemble model diversity and learning in a computing environment by a processor, comprising:
    creating one or more data sets by combining one or more clusters of data points of a minority class with only a random number of selected data points of a majority class, wherein the random number of selected data points is used to form balanced data due to an imbalance of the data points of the minority class;
    creating one or more ensemble models from the one or more data sets of balanced data using a supervised machine learning operation; and
    predicting an occurrence of an event using the one or more ensemble models.

2. The method of claim 1, further including determining a score for a test data point by combining one or more predictions from the one or more ensemble models.

3. The method of claim 1, further including:
    extracting one or more features from a plurality of data points;
    classifying those of the plurality of data points into the majority class or the minority class according to the one or more features.

4. The method of claim 1, further including:
    clustering a plurality of minority class data points into a K number of clusters, wherein the K number of clusters form the minority class; and
    augmenting each of the K number of clusters the minority class with the random number of the selected data points of the majority class.

5. The method of claim 1, further including detecting one or more sub-classes of the minority class.

6. The method of claim 1, further including partitioning the minority class into the one or more clusters of data points using the supervised machine learning operation.

7. The method of claim 1, further including labeling the one or more clusters of data points of the minority class according to predefined criteria.

8. A system for implementing enhanced ensemble model diversity and learning in a computing environment, comprising:
    one or more computers with executable instructions that when executed cause the system to:
        create one or more data sets by combining one or more clusters of data points of a minority class with only a random number of selected data points of a majority class, wherein the random number of selected data points is used to form balanced data due to an imbalance of the data points of the minority class;
        create one or more ensemble models from the one or more data sets of balanced data using a supervised machine learning operation; and
        predict an occurrence of an event using the one or more ensemble models.

9. The system of claim 8, wherein the executable instructions determine a score for a test data point by combining one or more predictions from the one or more ensemble models.

10. The system of claim 8, wherein the executable instructions:
    extract one or more features from a plurality of data points;
    classify those of the plurality of data points into the majority class or the minority class according to the one or more features.

11. The system of claim 8, wherein the executable instructions:
    cluster a plurality of minority class data points into a K number of clusters, wherein the K number of clusters form the minority class; and
    augment each of the K number of clusters the minority class with the random number of the selected data points of the majority class.

12. The system of claim 8, wherein the executable instructions detect one or more sub-classes of the minority class.

13. The system of claim 8, wherein the executable instructions partition the minority class into the one or more clusters of data points using the supervised machine learning operation.

14. The system of claim 8, wherein the executable instructions label the one or more clusters of data points of the minority class according to predefined criteria.

15. A computer program product for implementing enhanced ensemble model diversity and learning by a processor, the computer program product comprising a non-transitory computer-readable storage medium having computer-readable program code portions stored therein, the computer-readable program code portions comprising:

an executable portion that creates one or more data sets by combining one or more clusters of data points of a minority class with only a random number of selected data points of a majority class, wherein the random number of selected data points is used to form balanced data due to an imbalance of the data points of the minority class;

an executable portion that creates one or more ensemble models from the one or more data sets of balanced data using a supervised machine learning operation; and an executable portion that predicts an occurrence of an event using the one or more ensemble models.

16. The computer program product of claim 15, further including an executable portion that determines a score for a test data point by combining one or more predictions from the one or more ensemble models.

17. The computer program product of claim 15, further including an executable portion that:

extracts one or more features from a plurality of data points;

classifies those of the plurality of data points into the majority class or the minority class according to the one or more features.

18. The computer program product of claim 15, further including an executable portion that:

clusters a plurality of minority class data points into a K number of clusters, wherein the K number of clusters form the minority class; and augments each of the K number of clusters the minority class with the random number of the selected data points of the majority class.

19. The computer program product of claim 15, further including an executable portion that:

detect one or more sub-classes of the minority class; or label the one or more clusters of data points of the minority class according to predefined criteria.

20. The computer program product of claim 15, further including an executable portion that partitions the minority class into the one or more clusters of data points using the supervised machine learning operation.

* * * * *